3,531,389
TWO STAGE RADIATION POLYMERIZATION OF ETHYLENE IN THE PRESENCE OF A CARBON DIOXIDE MEDIUM
Tsutomu Kagiya, Kyoto-shi, and Hiroshi Mitsui, Sueo Machi, and Miyuki Hagiwara, Takasaki-shi, Japan, assignors to Japan Atomic Energy Research Institute
No Drawing. Filed July 10, 1967, Ser. No. 652,010
Claims priority, application Japan, Aug. 3, 1966,
41/50,502
Int. Cl. C08d *1/00;* C08f *1/16*
U.S. Cl. 204—159.22               9 Claims

ABSTRACT OF THE DISCLOSURE

The present invention relates to a two stage radiation polymerization of ethylene using carbon dioxide as a reaction medium in which the polymerization is carried out in two stages, that is, a first stage of high dose rate irradiation and a second stage of low dose rate irradiation which follows the first. Efficiency of utilization of the radiation energy is improved by this method.

CROSS-REFERENCE TO RELATED APPLICATION

Applicants' basic invention relating to the use of carbon dioxide as a reaction medium in radiation polymerization of ethylene is disclosed in copending U.S. patent appln. Ser. No. 620,488.

BACKGROUND OF THE INVENTION

Polymerization of ethylene by means of ionizing radiation is known, and polymerization of ethylene by means of ionizing radiation in a carbon dioxide medium is also known.

In the course of applicants' research on the radiation induced polymerization of ethylene in a carbon dioxide medium, a study of the reaction kinetics of the radiation induced polymerization of ethylene in the presence of carbon dioxide led applicants to believe that the life of the active sites of growing chains of polymerizing ethylene is considerably long under irradiation by an ionizing radiation. On the basis of this belief, an attempt was made at polymerizing ethylene by a two stage irradiation in the presence of carbon dioxide as a reaction medium, and it was found that, if once the polymerization were started by irradiation of a comparatively high dose rate, the chain growth reaction could be maintained by continued irradiation with an extremely low dose rate, thus effecting an unexpected economy in the radiation energy source.

SUMMARY OF THE INVENTION

In accordance with this invention, ethylene is polymerized in a carbon dioxide medium by irradiating same with an ionizing radiation in two stages. The first stage irradiation is intended for the purpose of initiating the polymerization and the radiation is applied to the ethylene at a dose rate of $10^4$–$10^6$ roentgens per hour at a temperature lower than 60° C. The second stage irradiation at the low dose rate is intended for the purpose of maintaining the growth reaction of the polymer and the dose rate used in this stage is from several tens to several thousands of roentgens per hour, or from 10 to 10,000 roentgens per hour. The preferred does rate is 100–1000 roentgens per hour. This second stage irradiation is performed at a temperature between 0° C. and 120° C., preferably between 0° C. and 30° C.

The reason why the temperature of the first stage irradiation is lower than 60° C. is that long-lived active sites of growing chains are not formed at temperature above 60° C.

When the reaction temperature exceeds 31° C. the (critical temperature of carbon dioxide), the reaction mixture exists in the gaseous state. Polymerization still takes place without any difficulty however and polyethylene is produced from the gaseous ethylene.

The second stage irradiation is preferably carried out at a temperature lower than the melting point of the produced polyethylene, that is, lower than about 120° C. However, it can also be carried out at temperatures higher than this. In such a case the polyethylene is produced in a molten state and special means will be necessary for removing the product from the reaction apparatus.

In the examples which follow only gamma rays and X-rays are specifically referred to, but in the field of radiation chemistry it is well known that all ionizing radiations have the same effect on the polymerization of ethylene. This is described in "Radiation Chemistry of Polymeric System," A. Chapiro, Interscience Publishers, New York, 1962, pp. 1–36. Therefore, the ionizing radiations applicable to the method of this invention include X-rays, gamma rays; beta rays, alpha rays; beams of protons, neutrons, or fission fragments, etc.

The amount of carbon dioxide medium to be added to the ethylene is 5–30 mole percent of ethylene, and the preferable amount is about 20 mole percent. The method of this invention can be carried out at a high pressure not less than 100 kg./cm.$^2$. As the reaction pressure is increased, the polymerization velocity increases. However, a high pressure apparatus is quite expensive, so the optimum reaction pressure is selected by considering such economic factors as apparatus design and manufacturing operation.

Of course, the method of the invention is applicable to both batch operation and continuous operation.

This invention has established a new process for manufacturing polyethylene in which polyethylene is produced by radiation with ten to several tens times as much as the G-value of the prior art radiation polymerization.

The invention will be illustrated now by way of the following examples, but the scope of the invention is not restricted thereto.

EXAMPLE 1

A mixture of ethylene and carbon dioxide ($C_2H_4$:$CO_2$=2:1 by weight)

was charged to a high pressure reaction vessel of stainless steel having a volume of 100 ml. until the internal pressure was 400 kg./cm.$^2$ at 20° C. The amount of ethylene charged was 40 g.

The vessel was subjected to gamma radiation from cobalt-60 at a dose rate of $2.5 \times 10^4$ roentgens per hour at 20° C. for 2 hours, and thereafter, the mixture was further subjected to the same gamma radiation at a dose rate of 480 roentgens per hour at 25° C. for 5 hours.

A white powder (1.758 g.) was obtained and its infrared spectrum showed that the product was pure polyethylene free of carbon dioxide structure. Its specific gravity was 0.932, its degree of crystallinity was 65%, and the average molecular weight was 430,000.

When the fisrt stage irradiation was completed the weight of the product was 0.686 g., its average molecular weight was 204,000, and the G-value in this stage was $1.2 \times 10^4$. Therefore, as a result of the second stage irradiation, the amount of the product increased by 1.072 g. and the molecular weight increased by 226,000. The G-value in the second stage irradiation was as high as $4.3 \times 10^5$.

EXAMPLE 2

The same ethylene-carbon dioxide mixture as used in Example 1 was charged to the same reaction vessel at 20° C. until the internal pressure was 400 kg./cm.$^2$. The amount of ethylene charged was 40 g. The vessel was subjected to gamma radiation from a cobalt-60 source at a dose rate of $2.5 \times 10^4$ roentgens per hour for 2 hours at 20° C., and thereafter, the mixture was further subjected to the same gamma radiation at a dose rate of $1.1 \times 10^3$ roentgens per hour at 90° C. for 5 hours.

Polyethylene (0.834 g.) was obtained. Its average molecular weight was 260,000; its specific gravity was 0.930; and the degree of crystallinity was 64%.

When the first stage irradiation was finished, the weight of the product was 0.686 g. and the G-value was $1.2 \times 10^4$. Therefore, as a result of the second stage irridation the amount of the product increased by 0.148 g. and the G-value in this stage was $2.3 \times 10^4$.

EXAMPLE 3

The same ethylene-carbon dioxide mixture as used in Example 1 was charged to the same reaction vessel at 20° C. until the internal pressure was 400 kg./cm.$^2$. The amount of ethylene charged was 40 g. The vessel was subjected to gamma radiation from a cobalt-60 source at a dose rate of $2.5 \times 10^4$ roentgens per hour for 2 hours at 20° C., and thereafter, the mixture was further subjected to the same gamma radiation at a dose rate of $1.1 \times 10^3$ roentgens per hour at 25° C. for 3 hours.

Polyethylene (0.862 g.) was obtained. Its average molecular weight was 390,000; its specific gravity was 0.932; and the degree of crystallinity was 65%.

When the first stage irradiation was finished, the weight of the product was 0.686 g. and the G-value was $1.2 \times 10^4$. Therefore, as a result of the second stage irradiation the amount of the produced polymer increased by 0.862 g. and the G-value was $1.6 \times 10^5$ in the latter stage.

EXAMPLE 4

The same ethylene-carbon dioxide mixture was charged to the same reaction vessel at 20° C. until the internal pressure was 400 kg./cm.$^2$. The amount of ethylene charged was 40 g. The vessel was subjected to gamma radiation from a cobalt-60 source at a dose rate of $1.0 \times 10^4$ roentgens per hour for 2 hours at 20° C., and thereafter, the mixture was further subjected to the same radiation at a dose rate of 100 roentgens per hour at 25° C. for 5 hours.

Polyethylene (0.846 g.) was obtained. Its average molecular weight was 420,000. When the first stage radiation was finished, the weight of the product was 0.301 g., its molecular weight was 240,000 and the G-value was $1.3 \times 10^4$. Therefore, as a result of the second stage irradiation the amount of the produced polyethylene increased by 0.545 g., and the G-value for this stage was $9.4 \times 10^5$.

EXAMPLE 5

The same ethylene-carbon dioxide mixture was charged to the same reaction vessel at 20° C. until the internal pressure was 400 kg./cm.$^2$. The amount of ethylene charged was 40 g. The vessel was subjected to X-rays at a dose rate of $2.5 \times 10^4$ roentgens per hour for 2 hours at 20° C., and thereafter, the mixture was further subjected to the same radiation at a dose rate of 900 roentgens per hour at 25° C. for 3 hours.

Polyethylene powder (1.367 g.) was obtained. Its average molecular weight was 430,000; its specific gravity was 0.932; and the degree of crystallinity was 65%.

When the first stage irradiation was finished, the weight of the product was 0.702, its molecular weight was 165,000, and the G-value was $1.2 \times 10^4$.

Therefore, as a result of the second stage irradiation the amount of the product increased by 0.665 g. and the G-value in this stage was $2.1 \times 10^5$.

The X-rays used in this example were generated by irradiating a gold plate target with electron beams from a Van de Graaff electron acceleartor, which was operated at 30 $\mu$a. current and 1,0000 kv. The dose rate was selected by varying the distance between the target and the reaction vessel.

What we claim is:

1. A method comprising subjecting ethylene, in the presence of 5–30 mol percent based on ethylene of carbon dioxide, to a first dose of ionizing radiation to initiate polymerization of the ethylene and then to a second dose of said ionizing radiation, which is at a lower rate than the first dose, said second dose being at a rate sufficient to continue the thus initiated polymerization but insufficient to initiate polymerization.

2. A method as claimed in claim 1 in which the first dose is at the rate of $10^4$ to $10^6$ roentgens/hour and the second dose is at he rate of 10 to $10^4$ roentgens/hour.

3. A method as claimed in claim 2 in which the second dose is at the rate of 100 to 1000 roentgens/hour.

4. A method as claimed in claim 1, in which the temperature during the first irradiating dose is less than 60° C. and the temperature during the second irradiating dose is 0° to 120° C.

5. A method as claimed in claim 4 in which the temperature during the second irradiating dose is 0° to 30° C.

6. A method as claimed in claim 1 in which irradiating is effected at a pressure of not less than 100 kg./cm.$^2$.

7. A method as claimed in claim 1 in which the amount of carbon dioxide is about 20 mol percent.

8. A method as claimed in claim 1 in which the ionizing radiation is X-rays, $\gamma$-rays, $\beta$-rays, $\alpha$-rays, a beam of protons, a beam of neutrons, or a beam of fission fragments.

9. A method as claimed in claim 1 in which the temperature during the second dose is above 120° C. and a molten polyethylene is formed.

References Cited

FOREIGN PATENTS 835,121    5/1960    Great Britain

MURRAY T. TILLMAN, Primary Examiner

R. B. TURER, Assistant Examiner

U.S. Cl. X.R.

260—94.9